United States Patent [19]
Garnett

[11] 4,414,724
[45] Nov. 15, 1983

[54] TOOL CHANGING MECHANISM

[75] Inventor: Donald W. Garnett, Grand Ledge, Mich.

[73] Assignee: The Olofsson Corporation, Lansing, Mich.

[21] Appl. No.: 276,806

[22] Filed: Jun. 24, 1981

[51] Int. Cl.³ .............................................. B23B 29/24
[52] U.S. Cl. .......................................... 29/39; 29/568; 82/36 B
[58] Field of Search ................... 29/568, 26 A, 39, 40, 29/27 C; 82/25, 36 A, 36 B; 409/232, 234; 408/238, 239 R, 239 P

[56] References Cited

U.S. PATENT DOCUMENTS

| 3,375,742 | 4/1968 | Sturm | 82/36 A |
| 4,018,112 | 4/1977 | Heaton et al. | 82/36 A X |
| 4,055,095 | 10/1977 | Gramespacher | 82/36 A |
| 4,135,418 | 1/1979 | McCray | 82/36 A |
| 4,197,771 | 4/1980 | Heaton | 82/36 B |
| 4,218,816 | 8/1980 | Dormehl | 29/568 X |
| 4,270,422 | 6/1981 | Anderson | 82/36 B |

FOREIGN PATENT DOCUMENTS

| 820519 | 11/1951 | Fed. Rep. of Germany | 29/39 |
| 197807 | 7/1978 | Fed. Rep. of Germany | 82/36 B |
| 411506 | 8/1945 | Italy | 29/39 |

Primary Examiner—William R. Briggs
Attorney, Agent, or Firm—Barnes, Kisselle, Raisch, Choate, Whittemore & Hulbert

[57] ABSTRACT

Tool changing mechanism for changing tools in boring and turning machines of the type in which the part revolves but the tooling does not revolve. A magazine containing tools with new tool bits is provided preferably at the front of the machine so that it is accessible and fully visible to the operator. Means are provided for relatively moving the machine turret and magazine into effective alignment so that a tool may be transferred from a tool holder on the magazine to the tool holder on the turret, and vice versa.

21 Claims, 8 Drawing Figures

TOOL CHANGING MECHANISM

This invention relates generally to tool changing mechanism and refers more particularly to automatic means for changing tools in boring and turning machines of the type in which the part revolves but the tooling does not revolve.

SUMMARY OF INVENTION

The tool changer of this invention is adapted to change tools having considerable length in order to reach into deep bores or to turn a part, wherein the tool must reach beyond the end face of a part which has considerable thickness. Among the objects of this invention are to:

(1) Automatically exchange tools having worn or broken tool bits with tools having new tool bits.

(2) Precisely position the tool with respect to the X, Y, Z and rotational axes.

(3) Rigidly hold the tool in position against external forces, especially the forces heavy roughing cuts.

(4) Reduce the down time of the machine by exchanging tools rapidly by means which may be preprogramed.

(5) Reduce labor costs by eliminating the need for a mechanic and his tools to exchange machine tools.

(6) Reduce labor costs by reducing the need to monitor the machine, since the machine has the capability of changing tools:

(a) After machining a pre-set number of parts.

(b) When the worn tool offset has moved a pre-determined distance.

(c) When gaging of the machined part indicates an ability to obtain the correct part size.

(d) When a worn or broken tool is indicated.

(7) Improve operator safety by rendering it unnecessary for the operator to be physically present in the operating area of the machine in order to change tools.

(8) Provide a magazine to hold tool bars for tool changing which is accessible and visible to the operator from the front for easier loading.

(9) Provide mechanism for tool changing which will operate effectively in an environment of cast iron dust, steel chips and coolants.

(10) Provide mechanism for tool changing which may be manually operated as well as machine operated.

(11) Provide a simple inexpensive mechanism for changing tools.

(12) Provide a rugged mechanism which will withstand severe abuse without damage.

(13) Provide mechanism capable of holding and changing tool bars of different configuration within the same system.

BRIEF DESCRIPTION OF THE DRAWINGS

These and other objects will become more apparent from the following description, especially when considered with the accompanying drawings.

DETAILED DESCRIPTION

Referring now more particularly to the drawings, a multi-sided indexable tool turrent is generally indicated by the numeral 10, and an indexable magazine wheel in front of the turret for holding a supply of tools is generally indicated at 12.

Figure 1:
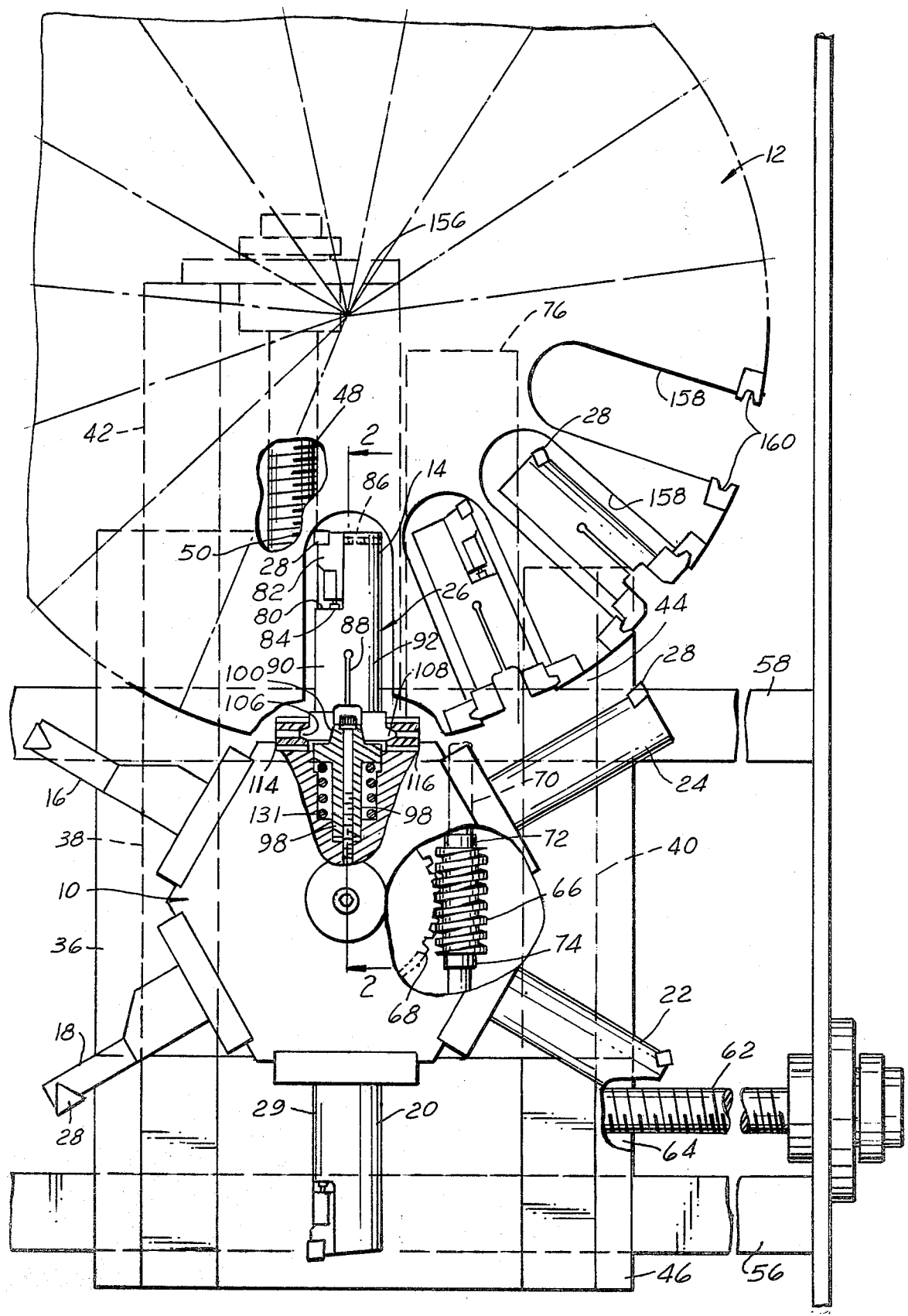
FIG. 1 is an elevational view of tool changing mechanism constructed in accordance with the invention.

The tool turret 10 may be of any shape but is seen in FIG. 1 as being in the shape of a regular hexagon having provision for carrying radially extending tools 14, 16, 18, 20, 22 and 24, one on each of its six sides. Each of these tools consists generally of a tool bar 26 carrying a tool bit 28 and having an elongated body 29 and a base 30. The bodies of the tool bars may be of different configurations as shown, but the bases 30 of the tool bars are all of the same configuration.

The tool turret 10 is fitted with a central bearing 32 for rotation on a horizontal shaft 34 which shaft is carried by the turret housing 36. The turret housing 36 is equipped with gibs 38 and 40 to permit vertical movement of the housing on vertical ways 42 and 44 of a carriage 46. Vertical movement is imparted to the housing 36 by a power driven lead screw 48 on the carriage which engages a threaded portion 50 of the turret housing. Carriage 46 is equipped with gibs 52 and 54 for horizontal movement on the hoizontal ways 56 and 58 of the machine base 60. The carriage 46 is moved horizontally by means of a power driven lead screw 62 on the machine base which engages a threaded portion 64 of the carriage. Any suitable means may be provided to drive the lead screws 48 and 62.

The tool turret 10 is rotated to pre-determined positions about the axis of shaft 34 by means of a worm 66 which engages a worm gear 68 coaxially affixed to the tool turret 10. Worm 66 is mounted on shaft 70 which is bearing-mounted at 72 and 74 on the turret housing 36. Servo motor 76 is coupled to shaft 70 and provides the power required to turn and position the tool turret 10. Servo motor 76 is mounted on housing 36. The tool turret 10 is capable of being indexed by means of the servo motor to place any of the tools 14–24 in a vertical or 12 o'clock position at the top of the tool turret or in any other position desired. FIG. 1 shows tool 14 in the 12 o'clock vertical position.

The body 29 of the tool bar 26 of the tool 20 is cylindrical to enable it to enter and bore holes of a larger diameter. The outer end of the body of the tool bar is recessed with a seat 80 to receive a commercially available tool cartridge 82 containing a replaceable tool bit 28. By means of the adjusting screws 84 and 86, the cutting tip of the tool bit may be precisely positioned in reference to the mounting base 30 of the tool. The cutting tip may be preset at a remote location away from the actual boring machine of which the turret 10 is a part. All of the tools 14 to 24 are similarly constructed with respect to the adjustable mounting of the tool bit. A number of these tools may be magazined in the wheel 12 for quick replacement when needed, in a manner to be more fully described hereinafter.

The base 30 of each of the tools is essentially square in plan view. A central, longitudinally extending slot 88 divides the base and lower portion of the body into two legs 90 and 92. The lower extremity of slot 88 is machined to provide two opposed lands 94 and 96 which are tapered toward one another in an outward direction, that is a direction toward the tool bit. Lands 94 and 96 are slanted at the same angle with respect to the longitudinal center line of the tool. These lands are tapered to receive the head 100 of a spreading wedge block 98 on the tool turret 10, it being understood that one such wedge block is provided at each of the six faces of the tool turret for holding a tool on the turret in that particular position. The head 100 is an elongated portion of the wedge block which extends parallel to the shaft 34 on which the turret rotates and has the side surfaces 102 and 104 tapered at the same angle as the lands 94 and 96 for full surface-to-surface engagement therewith.

The laterally outer sides of the legs 90 and 92 of the tool bar are machined at the base to provide two blunted wedges 106 and 108 having the outwardly tapered surfaces 110 and 112. These wedges are adapted to be received in confronting recesses 117 in retainers or seat blocks 114 and 116 on the turret which are spaced apart circumferentially of the turret and have seat block surfaces 118 and 120 in the recesses tapered to the same degree as surfaces 110 and 112 of wedges 106 and 108 for full surface-to-surface contact therewith. The recesses are complementary in shape to the wedges 106 and 108 and extend parallel to the shaft 34 on which the turret rotates and are open at both front and rear. There are a pair of seat blocks 114 and 116 on each of the six faces of the turret.

The spreading wedge block 98 has coaxial cylindrical portions 122 and 124 extending from head 100 and slidably received in radially extending cylindrical recesses 126 and 128 in the tool turret. A bolt 130 extending radially from the turret passes through the center of the wedge block. The wedge block is capable of sliding movement on the bolt, but its outward movement is limited by the head of the bolt. The wedge block 98 is urged outward by a coil spring 131 bearing against the face of recess 128 and against the cylindrical portion 122. A bolt 132, parallel to bolt 130, is anchored in turret 10 and is slidably received in the head 100 of the wedge block near the front end thereof to prevent the wedge block from rotating. The bolt 132 also serves as a means of manually depressing wedge block which is accomplished by rotating the bolt to bring its head down against the wedge block.

Figure 4:
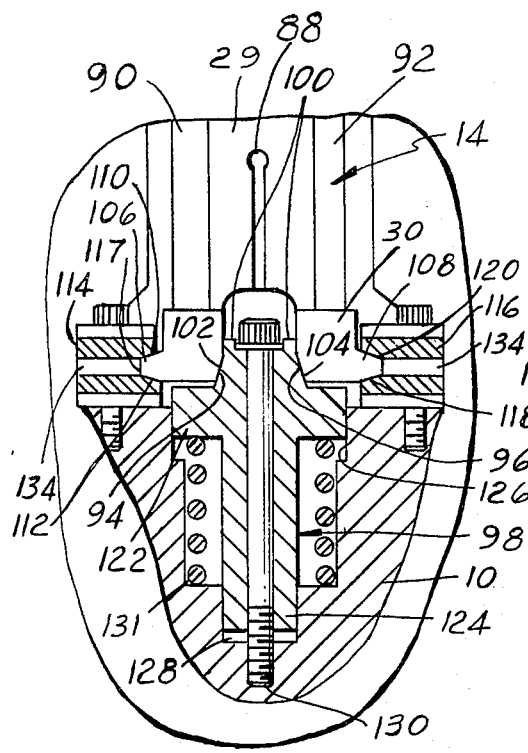
FIG. 4 is an enlargement of a portion of FIG. 1.
Figure 5:
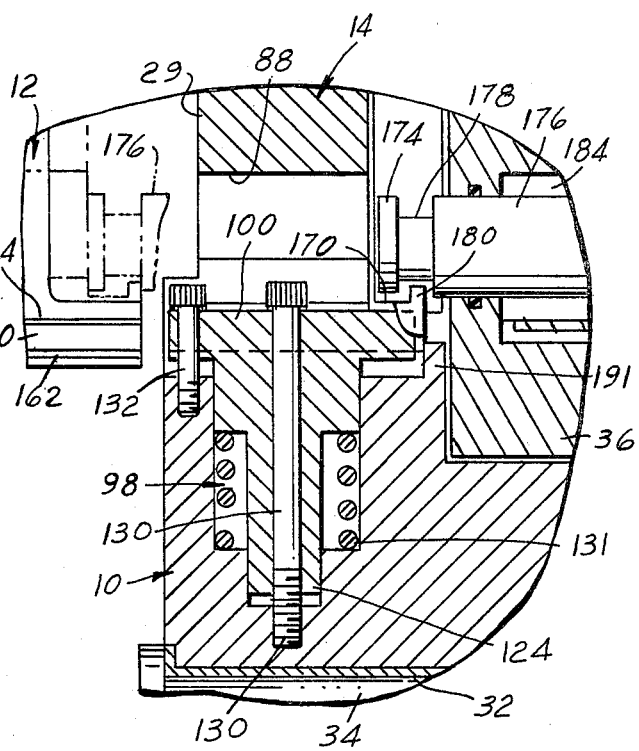
FIG. 5 is an enlargement of a portion of FIG. 2.
Figure 7:
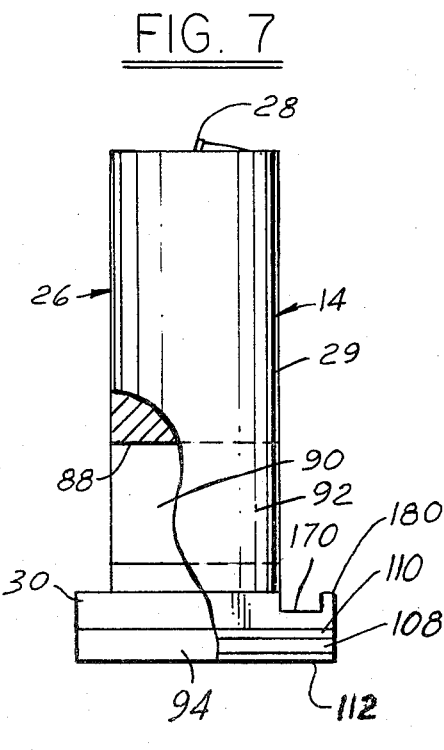
FIG. 7 is an elevational view of a tool with parts shown in section.

The tapered surfaces 102 and 104 of the wedge block and the tapered surfaces 118 and 120 of the seat blocks 114 and 116 are elongated from front to rear of the turret and are substantially flat and lie in planes which are parallel to the axis of shaft 34 about which the turret rotates. The tapered surfaces on each tool, namely the lands 94 and 96, and surfaces 110 and 112 of wedges 106 and 108, are also elongated and are parallel to shaft 34 when the tool is rotated properly to permit insertion in the turret. When the tool is mounted and clamped on the turret in the position shown in FIGS. 4 and 5, the wedge block 98 is urged radially outwardly by spring 131 causing the surfaces 102 and 104 on the head of the wedge block to make full surface-to-surface contact with the lands 94 and 96 on the tool to flex or spread the legs 90 and 92 of the tool and force the tapered surfaces 110 and 112 of the tool wedges 106 and 108 into full surface-to-surface wedging contact with the tapered seat block surfaces 118 and 120. The tool is thus firmly clamped in position. In order to remove the tool, the wedge block 98 is depressed radially inwardly against the force of spring 131 to release the tool from the influence of the wedge block. Since the tool is of a resilient material, the legs 90 and 92 will return to an unstressed position such that the tool wedge surfaces 106 and 108 will withdraw from the seat block surfaces sufficiently to establish a sliding clearance and permit axial removal of the tool. A tool may obviously be axially inserted in the same manner. Since the surfaces 94 and 96 of the tools and surfaces 102 and 104 of the wedge block slide on one another during insertion and withdrawal of the tools, the surfaces are sometimes referred to as slide surfaces.

Figure 6:
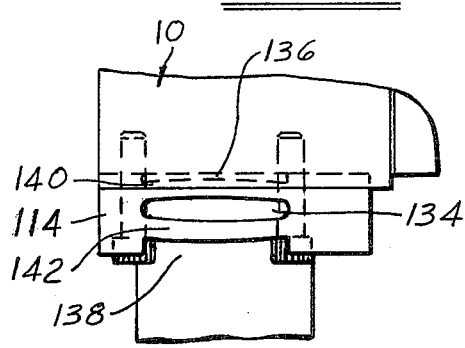
FIG. 6 is an enlargement of another portion of FIG. 2.
Figure 8:
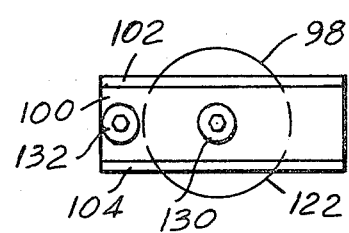
FIG. 8 is a plan view of a wedge block.

Referring to FIG. 6, the tapered seat blocks 114 and 116 each have a slot 134 in the central area extending through the seat block and intersecting its recess 117. Reliefs 136 and 138 are machined in the radially inner and outer surfaces of the seat block on opposite sides of slot 134. Slot 134 combines with the reliefs 136 and 138 to define two resiliently flexible web members 140 and 142. The purpose of these web members will now be explained.

Since a primary goal of this invention is to provide secure attachment of tools 14–24 to tool turret 10 and locate them precisely, it is necessary that firm pressure must be provided to anchor the four corners at the ends of the tapered surfaces 110 and 112 of the two blunted wedges 106 and 108. During manufacture, the tapered surfaces 110 and 112, while intended to be perfectly flat, may become slightly crowned. Also, during long usage, the ends of the blunted wedges wear, leaving the middle crowned. If the tools 14–24 were to be locked in place with a crowned condition of the surfaces 110 and 112, firm pressure would be applied only at the high point of the crown. The ends of the tapered surfaces 110 and 112 at the four corners of the wedges 106 and 108 would not be securely clamped, resulting in a rocking action of the tool bars and imprecise positioning. Reliefs could be machined in the tapered surfaces 118 and 120 of the seat blocks 114 and 116, or in the tapered surfaces 110 and 112 of the blunted wedges 106 and 108, but then the interrupted slide surfaces would tend to bind during the insertion or withdrawal of tool bars to or from the turret.

The web members 140 and 142 allow the slide surfaces 118 and 120 of the seat blocks 114 and 116 and the slide surfaces 110 and 112 on the tool bars to be smooth throughout their length for non-binding sliding insertion and withdrawal of the tool bars and provide a resilient center section which can be deflected when engaged by the crowned slide surfaces 110 and 112 of the tool bars. The web members deflect fairly easily so that firm pressure may be exerted on the ends of the tapered surfaces 110 and 112 at the four corners of the tool bar wedges 106 and 108.

Likewise for the purpose of insuring secure attachment of the tool bars to the tool turret, the cylindrical portions 122 and 124 of the wedge block 98 should have a loose fit in the recesses 126 and 128 to allow the wedge block to shift sidewise and tilt slightly to insure that the tapered wedge block surfaces 102 and 104 will firmly contact the lands 94 and 96 of the tool bar.

Wedge block 98 may be retracted against the force of spring 131 either manually by means of bolt 132 or by means of an anvil 150 which is affixed to the stationary machine base 60 above the tool turret. The lower end of the anvil 150 is disposed above the rear end of the head 100 of a wedge block when the turret is rotated to place that wedge block in the vertical 12 o'clock position. Through appropriate moves of lead screws 48 and 62, which may be programed, the carriage 46 may be positioned horizontally and then the turret housing 36 may be positioned vertically to cause engagement of the lower end of anvil 150 with the head 100 of the wedge block. The wedge block may thus be machine depressed, compressing spring 131 and releasing the tool from the influence of the wedge block. As before stated, when there is no wedging spring force applied to the lands 94 and 96 of the tool bar, the legs 90 and 92 of the tool bar retract and establish a sliding clearance between the tool wedge surfaces 110 and 112 and the seat block surfaces 118 and 120 to permit the tool to be removed in an axial direction.

The magazine wheel 12 is mounted in front of the machine tool turret 10 for rotation on an axis 156 which is parallel to the axis of shaft 34 on which the tool turret rotates. The magazine wheel is circular and contains a plurality of radially extending tool slots 158 about its periphery. Such tool slots are shaped and fitted to receive tool bars of the type indicated at 14-24 having different tool bit configurations but mounting bases identical to those indicated at 30. The tool slots are provided near their outer extremities with elongated confronting transverse recesses 160.

The recesses 160 are complementary in shape to the tool wedges 106 and 108 and are adapted to slidably receive the wedges. The recesses 160 have surfaces 162 and 164 tapered to the same angle as tool wedge surfaces 110 and 112 for full surface-to-surface sliding contact therewith when a tool is inserted into or removed from a slot in the magazine wheel. In practice, at least one of the slots in the magazine wheel is left empty.

It will be seen that there is a small clearance between the magazine wheel and the front of the machine tool turret 10. The near proximity of the magazine wheel to the turret is such that a direct transfer of a tool from the one to the other may be carried out in the manner about to be described.

The magazine wheel is indexed about its axis by means of a commercially available power driven programmably positioned indexer 166 which is capable of positioning any magazine slot, whether carrying a tool or not, in a vertical or 6 o'clock position at the bottom of the wheel. The magazine wheel is located in a position such that a magazine slot, when in vertical 6 o'clock position at the bottom of the wheel, will have its recesses 160 in front of and directly in line with the recesses 117 of seat blocks 114 and 116 of the tool turret and its tapered surfaces 162 and 164 aligned with seat block tapered surfaces 118 and 120 so that a tool may be transferred from the wheel to the turret or vice versa.

The rear end of the base 30 of each tool bar has a transverse groove in the upper surface where indicated at 170 to receive the head 174 of piston rod 176. There is a neck 178 of reduced diameter between the head 174 and the main body portion of the piston rod 176 into which the upper rear edge or lip 180 of the base 30 of the tool bar extends. The piston rod 176 extends from the piston 182 which reciprocates in cylinder 184 formed in the turret housing 36. The piston 182 reciprocates in a front to rear direction parallel to the axis rotation of the turret and is provided to effect a sliding transfer of a tool 14-24 from the turret to a registering slot in the magazine 12 or vice versa.

In the present instance, reciprocation of the piston 182 is carried out by a compressed fluid such as air from a suitable source by way of lines 186 and 188 leading respectively to the head and rod ends of the piston. A suitable three position valve V is provided which in the "a" position directs pressure fluid to the head end of the piston to advance the piston and cause its head 174 to engage a tool in the 12 o'clock position on the turret and push it into a registering slot in the magazine 12 to the position shown in dotted lines in FIG. 5. In the "b" position of the valve, high pressure air is delivered to the rod end of the piston to retract the piston end, by engagement of the head 174 of the piston with the edge or lip 180 at the base of a tool in the 6 o'clock position in the magazine, to transfer that tool to the turret.

Figure 2:
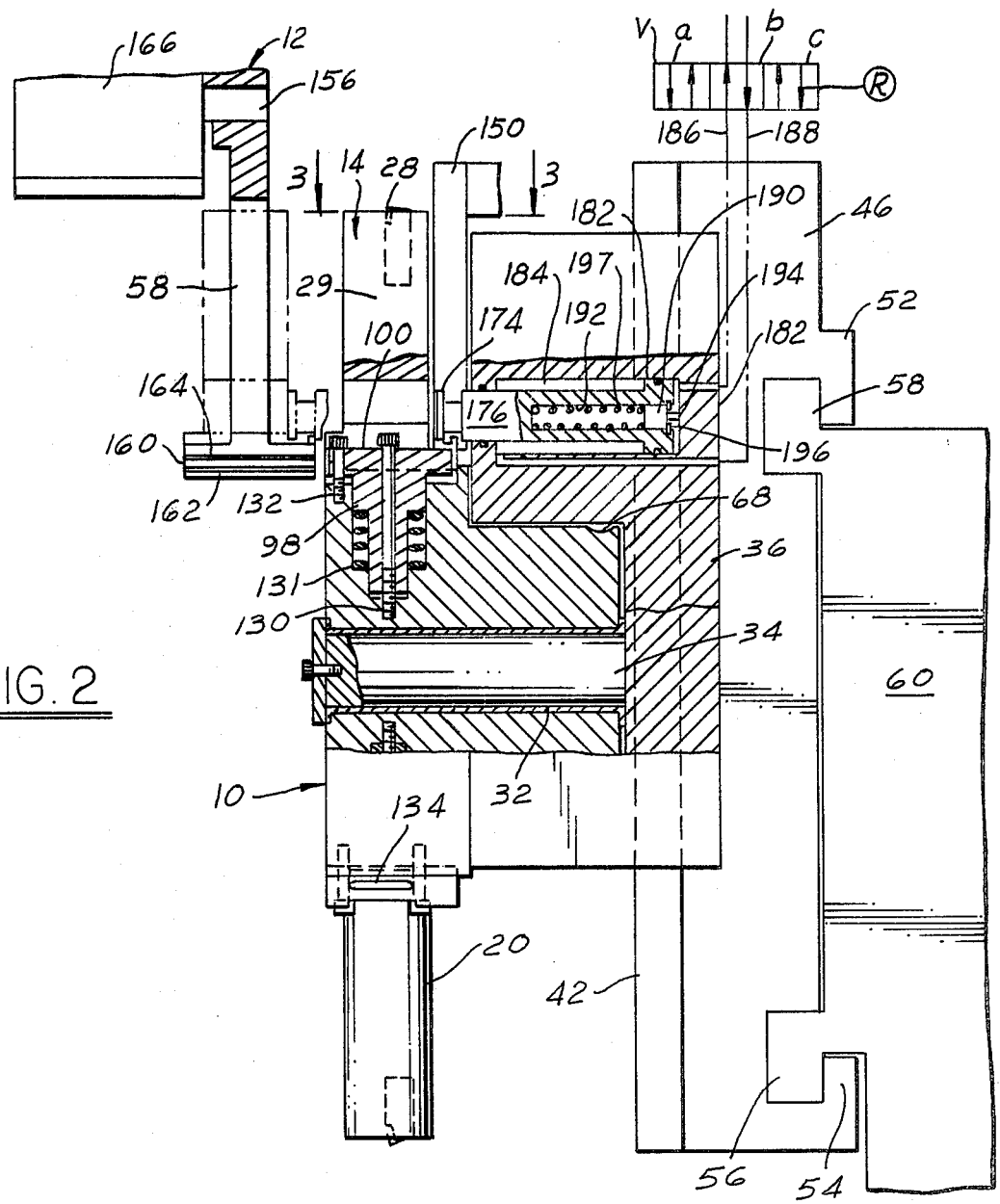
FIG. 2 is a view partially in elevation and partially in section on the line 2—2 in FIG. 1.
Figure 3:
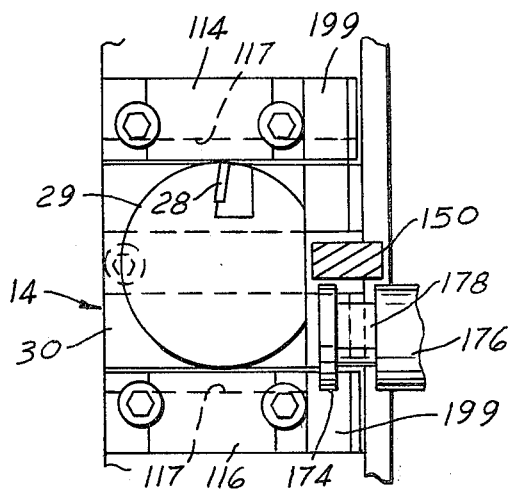
FIG. 3 is a view taken on the line 3—3 in FIG. 2.

At the end of the retraction stroke, the tool will bear against the rear end of the turret stop 191. Piston 182 does not reach the end of its cylinder and thus maintains a constant pressure on the tool. A plunger 190 is reciprocally mounted in a central passage 192 in the piston. In the retracted position of piston 182, plunger 190 will have its reduced end 194 in contact with the rear end of the cylinder 184 causing the plunger to move in a forward direction from the position shown in FIG. 2 away from plunger stop 196 against the pressure a spring 197 which is compressed in the passage between the plunger and the front end wall of the passage. In this position of the piston, its head 174 remains in pressure contact with the lip 180 on the tool. To disengage the head 174 from the lip 180 so as to permit unimpeded indexing of the turret, low pressure air is directed to the rod end of cylinder 184 by shifting valve V to the "c" position. The piston will then move away from its retracted position by the pressure of spring 197, which overcomes the low pressure air, until the plunger engages stop 196. The piston now assumes the FIG. 2 position releasing the lip 180 of the tool from contact with the head 174 of the piston. The turret may now index without interference from the piston head 174. It will be noted in FIG. 3 that the top surfaces of the seat blocks 114 and 116 are recessed where indicated at 199 to clear the piston head 174 when the turret is indexed.

The tool changer operates as follows:

1. Required tool bars 14 through 24 (with new tool bits precisely adjusted for position), are manually preloaded in the holding slots 158 of the magazine wheel 12, leaving one slot empty. Note in FIG. 1 that the slots are front accessible and fully visible to the operator.

2. When dull or broken tools require replacement, the tool bar in need of replacement is indexed to the 12 o'clock position of the tool turret 10. The tool turret is also programmed to align itself, by means of its horizontal ways, vertically in line with the magaxine wheel 12 and then moved upward and engage anvil 150 with wedge block 98, thus depressing the wedge block for clearance at the tool lands 94 and 96. With the wedge pressure removed from lands 94 and 96, the two legs 90 and 92 retract for clearance at the wedges 106 and 108 under the spring urging of the legs to return to their relaxed state.

3. The magazine wheel 12 is programmed to index its empty slot to its 6 o'clock position. The 12 o'clock tool position in the tool turret is now directly in line with the 6 o'clock empty slot position. The 12 o'clock tool has also engaged the piston rod head 174 with its groove 170.

4. Air valving is programmed to advance piston rod 176 ejecting tool bar 14 from its 12 o'clock tool turret slot and into the empty 6 o'clock magazine wheel slot. Travel is stopped with the dull tool bar in the magazine slot and the piston 182 at the end of its travel against the end of cylinder 184.

5. The magazine wheel 12 is now indexed to bring the required new tool bar to the 6 o'clock wheel position engaging the piston rod head 174 now in its extended or advanced position.

6. Programmed high pressure air valving now causes the piston rod 176 to retract, thus extracting the new tool bar from the wheel 12 and injecting it in the 12 o'clock tool turret position. Retract motion is stopped by the rear face of tool bar base 30 engaging the stop 191 of tool turret 10 for positive depth location of the tool bar. The piston 182 does not come to the end of its cylinder but maintains a constant pressure on the tool bar to seat it on the locating stop 191.

7. Downward motion of the tool turret is programmed thus disengaging the rear end of wedge 98 from anvil 150. Under the urging of heavy spring 131, wedge block 98 engages lands 94 and 96 for a spreading action of legs 90 and 92 of the tool bar. The wedges 106 and 108 first engage upper tapered surfaces 120 of seat blocks 114 and 116 and then are forced downward until firm contact is made with the lower tapered surfaces 118 of the seat blocks. Further expansion of legs 90 and 92 by the wedge action of wedge block 98 under the unfluence of heavy spring 131 is prevented. The base 30 of tool bar 14 is now rigidly locked in the double V block construction and against the face 191 of the tool turret 10. Motion in all modes including rotational is therefore prevented. The operating clearances of sliding and expanding are tolerant of a gritty environment and will securely hold the tool inspite of less than desirable conditions.

8. Air pressure causing the retract of piston rod 176 is now valved to a low pressure. Spring plunger 190 overcomes this lower pressure to extend the piston head 174 slightly, thus providing clearance (see FIG. 5) for subsequent tool turret index action.

9. The dull or broken tool bar may be held in the magazine wheel until several are in need of manual replacement at the convenience of the operator. The tool turret is now free to index any tool into a desired position and be driven in any desired vertical or horizontal path.

I claim:

1. Apparatus for holding a tool on the turret of a machine such as a boring or turning machine comprising spaced tool retaining means on said turret, spreading means on said turret between said retaining means and shiftable between advanced and retracted positions, a tool bar slotted at one end to provide a pair of legs and disposed in a position such that its legs are between said retaining means and adjacent to said spreading means, and means for shifting said spreading means to its advanced position to engage and spread said legs into engagement with said retaining means.

2. Apparatus as defined in claim 1, wherein a sliding clearance exists between said retaining means and said legs when said spreading means is retracted permitting removal or replacement of said tool bar.

3. Apparatus as defined in claim 1, wherein said retaining means have tapered surfaces and said legs have complementary surfaces adapted to frictionally engage the tapered surfaces of said retaining means when said legs are spread as aforesaid.

4. Apparatus as defined in claim 1, wherein said spreading means has tapered surfaces which engage and spread said legs when advanced as aforesaid.

5. Apparatus as defined in claim 3, wherein a sliding clearance exists between said tapered and complementary surfaces when said spreading means is retracted permitting removal or replacement of said tool bar in a direction transverse to said retaining means.

6. Apparatus as defined in claim 1, including spring means for advancing said spreading means, and means for retracting said spreading means against the force of said spring means.

7. Apparatus for holding a tool on the turret of a machine such as a boring or turning machine comprising means mounting said turret for rotation, spaced tool retaining means on said turret, a spreading wedge block on said turret between said retaining means and shiftable between advanced and retracted positions, a tool bar slotted at one end to provide a pair of legs and disposed in a position such that its legs are disposed between said retaining means in overlying relation to said wedge block, means for shifting said wedge block to its advanced position to engage and spread said legs into engagement with said retaining means, said retaining means having tapered surfaces and said legs having complementary tapered surfaces adapted to frictionally engage the tapered surfaces of said retaining means when said legs are spread as aforesaid, said wedge block having tapered surfaces which engage complementary tapered surfaces of said legs to spread said legs when advanced.

8. Apparatus as defined in claim 7, wherein said tapered surfaces of said retaining means extend in a direction parallel to the axis of rotation of said turret and a sliding clearance exists between said tapered surfaces of said retaining means and the first-mentioned complementary tapered surfaces of said legs when said wedge block is retracted permitting removal or replacement of said tool bar in said parallel direction.

9. Apparatus as defined in claim 7, including spring means for advancing said spreading means, and means for retracting said spreading means against the force of said spring means.

10. Tool changing apparatus for the turret of a machine such as a turning or boring machine, comprising a tool holder on said turret, a magazine, a plurality of tool holders on said magazine, means for relatively moving said turret and magazine to bring one of said tool holders on said magazine into register with said tool holder on said turret, said holder on said turret comprising a pair of spaced retaining means, said tool holders on said magazine each comprising a pair of spaced retaining means, said spaced retaining means on said turret and those of a registering holder on said magazine being in alignment with one another, said spaced retaining means on said turret and on said magazine each having slide surfaces permitting a tool to be transferred with a sliding motion from the retaining means on said turret to a registering retaining means on said magazine or vice versa, the slide surfaces of the pair of spaced retaining means on said turret and those of a registering pair on said magazine being in alignment with one another, means for transferring a tool from the retaining means of one of the registering tool holders to the retaining means of the other, wherein said tool comprises a tool bar slotted at one end to provide a pair of legs and disposed in a position such that its legs are between said spaced retaining means on said turret, and spreading means on said turret, shiftable between advanced and retracted positions and operative when advanced to spread the legs of said tool bar into frictional engagement with the slide surfaces of said retaining means on said turret.

11. Tool changing apparatus as defined in claim 10, wherein said legs of the tool bar have a wedging engagement with the slide surfaces of said retaining means in said turret when said tool bar legs are spread as aforesaid.

12. Tool changing apparatus as defined in claim 11, wherein a sliding clearance exists between the slide surfaces of the retaining means on said turret and said legs when said spreading means is retracted permitting removal or replacement of a tool bar.

13. Tool changing apparatus for the turret of a machine such as a boring or turning machine, comprising means mounting said turret for rotation, a tool holder comprising a pair of spaced tool retainers on said turret, a spreading wedge block on said turret between said retainers and shiftable between advanced and retracted positions, a tool bar slotted at one end to provide a pair of legs and disposed in a position between said retainers in overlying relation to said wedge block, means for shifting said wedge block to its advanced position to engage and spread said legs into engagement with said retainers, said retainers having tool bar holding surfaces adapted to frictionally grip said legs when said legs are spread as aforesaid, a tool magazine, a plurality of tool holders on said magazine each comprising a pair of spaced tool retainers, means for relatively moving said turret and said magazine to bring one of said tool holders on said magazine into register with said tool holder on said turret, the retainers of each tool holder on said magazine having tool bar holding surfaces which align with the tool bar holding surfaces of the retainers of the tool holder on said turret when the latter two tool holders are in register, there being a sliding clearance between the holding surfaces of said tool holder on said turret and said tool bar when said wedge block is retracted to permit said tool bar to be transferred with a sliding motion from the tool holder on said turret to a registering tool holder on said magazine or vice versa, and means for sliding a tool bar from the tool holder on said turret to a registering tool holder on said magazine.

14. Tool changing apparatus as defined in claim 13, wherein the tool bar holding surfaces of the tool holder on said turret are tapered relative to one another and are adapted to have a wedging engagement with complementary tapered surfaces on said tool bar.

15. Tool changing apparatus as defined in claim 13, wherein said tool bar holding surfaces of the tool holder on said turret are flexibly resilient to firmly clamp said tool bar dispite possible irregularities in the tappered surfaces of the latter.

16. Tool changing apparatus as defined in claim 14, including spring means for advancing said wedge block, and means for retracting said wedge block against the force of said spring means.

17. Tool changing apparatus as defined in claim 16, wherein said retracting means comprises an anvil, and means for relatively moving said turret and anvil to actuate the latter.

18. Tool changing apparatus as defined in claim 16, wherein said retracting means comprises a manually operable threaded member.

19. Tool changing apparatus as defined in claim 14, wherein said wedge block has tapered surfaces which engage complementary tapered surfaces of said legs to spread said legs when advanced.

20. Tool changing apparatus as defined in claim 13, wherein said means for sliding a tool bar from the tool holder on said turret to a registering tool holder on said magazine comprises a reciprocable piston having a head engageable with a tool bar, and means for reciprocating said piston.

21. Tool changing apparatus as defined in claim 20, wherein the means for reciprocating said piston includes means for moving it between advanced and retracted limiting positions to effect the transfer of the tool bar and for moving it to an intermediate position to release the tool bar.

* * * * *